(12) United States Patent
Xu

(10) Patent No.: US 10,115,195 B2
(45) Date of Patent: Oct. 30, 2018

(54) METHOD AND APPARATUS FOR PROCESSING BLOCK TO BE PROCESSED OF URINE SEDIMENT IMAGE

(71) Applicant: Siemens Healthcare Diagnostics Inc., Tarrytown, NY (US)

(72) Inventor: Juan Xu, Beijing (CN)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 5 days.

(21) Appl. No.: 15/306,858

(22) PCT Filed: Apr. 30, 2015

(86) PCT No.: PCT/US2015/028430
§ 371 (c)(1),
(2) Date: Oct. 26, 2016

(87) PCT Pub. No.: WO2015/168362
PCT Pub. Date: Nov. 5, 2015

(65) Prior Publication Data
US 2017/0053399 A1    Feb. 23, 2017

(30) Foreign Application Priority Data
Apr. 30, 2014    (CN) .......................... 2014 1 0183665

(51) Int. Cl.
*G06K 9/00*    (2006.01)
*G06T 7/00*    (2017.01)
(Continued)

(52) U.S. Cl.
CPC .............. *G06T 7/0012* (2013.01); *G06K 9/00* (2013.01); *G06K 9/00127* (2013.01);
(Continued)

(58) Field of Classification Search
CPC ........... G06K 2209/01; G06K 9/00127; G06K 9/00134; G06K 9/346; G06K 9/522;
(Continued)

(56) References Cited

U.S. PATENT DOCUMENTS 5,627,908 A * 5/1997 Lee .................... G01N 15/1475
382/128
5,978,498 A    11/1999 Wilhelm et al.
(Continued)

FOREIGN PATENT DOCUMENTS

CN    103593850 A    2/2014
CN    103678680 A    3/2014

OTHER PUBLICATIONS

International Search Report and Written Opinion of International Application No. PCT/US2015/028430 dated Aug. 5, 2015.
(Continued)

*Primary Examiner* — Aklilu Woldemariam
(74) *Attorney, Agent, or Firm* — Kyle D. Petaja

(57) ABSTRACT

Provided in the present invention are a method and apparatus for processing a block to be processed of a urine sediment image. The method comprises: calculating a variable number of local feature vectors of a block to be processed, wherein the local feature vector is a vector representing a feature of a local location of the block to be processed; classifying the variable number of local feature vectors into a fixed number of clusters so as to obtain a statistical histogram vector of the fixed number of clusters of the block to be processed, wherein the statistical histogram vector reflects the statistical distribution of the variable number of local feature vectors in the fixed number of clusters; and taking the statistical histogram vector as a feature in a feature set of block processing and processing the block to be processed.

12 Claims, 4 Drawing Sheets

(51) Int. Cl.
  *G06K 9/46* (2006.01)
  *G06T 7/11* (2017.01)
  *G06T 7/187* (2017.01)
  *G06T 7/194* (2017.01)
(52) U.S. Cl.
  CPC ......... *G06K 9/4671* (2013.01); *G06K 9/4676* (2013.01); *G06T 7/0081* (2013.01); *G06T 7/11* (2017.01); *G06T 7/187* (2017.01); *G06T 7/194* (2017.01); *G06T 2207/10056* (2013.01); *G06T 2207/20021* (2013.01); *G06T 2207/30004* (2013.01)
(58) Field of Classification Search
  CPC .. G06K 9/6278; G06K 9/4671; G06K 9/4676; G06T 7/0012; G06T 7/0081; G06T 2207/10056; G06T 2207/20021; G06T 2207/30004; G06T 17/20; G06T 2207/10048; G06T 2207/20141; G06T 2207/20144; G06T 2207/30036; G06T 2210/22; G06T 2210/41; G06T 7/11; G06T 15/08; G06T 19/00; G06T 2207/20212; G06T 2207/30028; G06T 7/41; G06T 2200/24; G06T 2207/10016; G06T 2207/30024; G06T 7/90; G06T 17/00; G06T 7/187; G06T 7/194; G06T 2207/30121; G06T 2207/30148; G06T 7/0006; A61B 5/0484; A61B 5/055; A61B 5/4088; A61B 5/7267; A61B 6/03; G06F 19/3437
  USPC ........ 382/103, 109, 133, 155, 159, 190, 266
  See application file for complete search history.

(56) References Cited

U.S. PATENT DOCUMENTS

| | | | | |
|---|---|---|---|---|
| 6,148,099 | A * | 11/2000 | Lee ...................... | G06T 7/0006 382/145 |
| 6,331,285 | B1 * | 12/2001 | Sharma .............. | A61K 51/0497 424/1.11 |
| 6,833,348 | B1 * | 12/2004 | Riccardi ............ | C07K 14/4705 514/12.2 |
| 2004/0208350 | A1 * | 10/2004 | Rea ........................ | G01M 11/00 382/128 |
| 2005/0251347 | A1 * | 11/2005 | Perona ............... | G06K 9/00134 702/19 |
| 2006/0160169 | A1 * | 7/2006 | Marcotte ................ | C12Q 1/025 435/34 |
| 2006/0253261 | A1 * | 11/2006 | Maier ..................... | G01N 21/65 702/19 |
| 2007/0014435 | A1 | 1/2007 | Mirowski et al. | |
| 2007/0211928 | A1 * | 9/2007 | Weng ................. | G01N 30/8624 382/128 |
| 2008/0269150 | A1 * | 10/2008 | Fischer .............. | A61K 38/1875 514/44 R |
| 2009/0215058 | A1 * | 8/2009 | Guyon ................. | C12Q 1/6886 435/6.12 |
| 2009/0220429 | A1 * | 9/2009 | Johnsen ............... | A61B 5/0484 424/9.3 |
| 2010/0079762 | A1 | 4/2010 | Kusuzawa | |
| 2011/0080955 | A1 | 4/2011 | Shi et al. | |
| 2011/0150341 | A1 | 6/2011 | Yamamoto et al. | |
| 2012/0177280 | A1 * | 7/2012 | Zhukov .............. | G01N 33/5076 382/133 |
| 2012/0195488 | A1 * | 8/2012 | Bennett ............. | G01N 33/5008 382/133 |
| 2014/0219538 | A1 * | 8/2014 | Guthrie .............. | G06K 9/00127 382/133 |
| 2015/0003701 | A1 * | 1/2015 | Klauschen ........... | G06K 9/4642 382/128 |
| 2015/0023568 | A1 * | 1/2015 | Lacey .................... | G06T 7/0008 382/115 |
| 2017/0132450 | A1 * | 5/2017 | El-Zehiry .......... | G01N 15/1463 |

OTHER PUBLICATIONS

Li et al.,"Automatic Detecting Particle Objects in Image", 2005, International Journal of Information Technology, vol. 11, No. 7, pp. 39-49.

Li et al., "A New Strategy for Urinary Sediment Segmentation based on Wavelet, Morphology and Combination Method", 2006, Computer Methods and Programs in Biomedicine 84, pp. 162-173.

Yang et al., "An Efficient Casts Recognition Algorithm in Urinary Sediment Images", Jul. 11-14, 2010, Proceedings of the 2010 International Conference of Wavelet Analysis and Pattern Recognition, pp. 33-37.

European Office Action of European Application No. 15786244.2 dated May 4, 2018.

Theodorisdis Sergios et al: "5.13.2 Visual-Based Video Copy Oetection Algorithm" In: "Academic Press Library in Signal Processing : Image and Video Compression and Multimedia", Academic Press, XP055470418, May 29, 2014, pp. 427-429.

Ningning Liu et al.: "A Selective Weighted Late Fusion for Visual Concept Recognition" In : "Fusion in Computer Vision", Jan. 1, 2014, Springer International Publishing, Cham, XP055470419, ISBN : 978-3-319-05696-8, pp. 1-28.

European Office Action of European Application No. 15786244.2 dated Apr. 11, 2017.

Hans et al., "Decision Fusion for Urine Particle Classification in Multispectral Images", Dec. 2010, in ICVGIP '10 Proceedings of the Seventh Indian Conference on Computer Vision, Graphics and Image Processing, pp. 1-8.

Liasis et al.,"Combination of Different Texture Features for Mammographic Breast Density Classification", Nov. 2012, Proceedings of the 2012 IEEE 12th International Conference on Bioinformatics & Bioengineering (BIBE), pp. 732-737.

Zhang et al.,"Lung Nodule Classification With Multilevel Patch-Based Context Analysis"; Apr. 2014, IEEE Transactions on Biomedical Engineering, vol. 61, No. 4, pp. 1155-1166.

* cited by examiner

METHOD AND APPARATUS FOR PROCESSING BLOCK TO BE PROCESSED OF URINE SEDIMENT IMAGE

The subject application claims benefit under 35 USC § 119(e) of Chinese Patent Application No. 201410183665.0, filed Apr. 30, 2014. The entire contents of the above-referenced patent application are hereby expressly incorporated herein by reference.

TECHNICAL FIELD

The present invention relates to biological detection, and in particular to a method and apparatus for processing a block to be processed of a urine sediment image.

BACKGROUND ART

In common urine sediment analysis, first, a urine sample image is shot using a microscope imaging system. Then, the candidate blocks in the urine sample image are segmented using, for example, an edge detection technology. By removing obvious background blocks from these candidate blocks, blocks to be processed are detected. Next, the blocks to be processed are processed.

Currently, there are mainly two directions of processing the blocks to be processed. The first direction is classification, i.e. directly classifying these blocks to be processed into various visible element (such as a cast, an epithelium and an erythrocyte) blocks and background blocks that are easy to be confused with visible elements. The other direction is block retrieval, which does not directly classify the blocks to be processed but retrieves blocks similar to the previously stored blocks to be processed in a database. The unique difference with regard to the result of classification lies in that block retrieval may retrieve a plurality of similar blocks to be provided to a user, and thus can provide more information for the user. The user may perform a further selection or judgment in the plurality of similar blocks.

The classification and block retrieval achieved by a machine automatically generally use an approach of machine learning. Several features for classification or block retrieval are specified and constitute a feature set. A large number of training sample blocks are firstly used to constitute a training sample set for training a processing model (a classification model or a block retrieval model). With regard to each training sample block in the training sample set, the features in the feature set are calculated for the processing model to learn. In this way, when the trained processing model receives a new block to be processed, the features in the feature set are calculated for the new block to be processed, and according to the calculated features in the feature set and with reference to the previous learning result, classification can be performed thereon or the previously stored similar images are retrieved therefor.

CONTENTS OF THE INVENTION

One embodiment of the present invention aims to improve the precision of processing a block to be processed of a urine sediment image.

According to one embodiment of the present invention, a method for processing a block to be processed of a urine sediment image is provided, comprising: calculating a variable number of local feature vectors of a block to be processed, wherein the local feature vector is a vector representing a feature of a local location of the block to be processed; classifying the variable number of local feature vectors into a fixed number of clusters so as to obtain a statistical histogram vector of the fixed number of clusters of the block to be processed, wherein the statistical histogram vector reflects the statistical distribution of the variable number of local feature vectors in the fixed number of clusters; and taking the statistical histogram vector as a feature in a feature set of block processing and processing the block to be processed.

In a particular implementation, the variable number of local feature statistical vectors comprise m scale invariant feature transform (SIFT) feature vectors and n local binary pattern (LBP) feature vectors, where m and n are variable positive integers. The step of classifying the variable number of local feature vectors into a fixed number of clusters comprises: classifying the m SIFT feature vectors into k1 clusters and classifying the n LBP feature vectors into k2 clusters so as to obtain a statistical histogram vector of the k1 clusters of the SIFT feature vectors and a statistical histogram vector of the k2 clusters of the LBP feature vectors, where k1 and k2 are fixed positive integers.

In a particular implementation, the step of taking the statistical histogram vector as a feature in a feature set of block processing and processing the block to be processed comprises: combining the statistical histogram vector of the k1 clusters of the SIFT feature vectors and the statistical histogram vector of the k2 clusters of the LBP feature vectors; and taking the combined statistical histogram vector as a feature in a feature set of block processing and processing the block to be processed.

In a particular implementation, the step of calculating a variable number of local feature vectors of a block to be processed comprises: converting the block to be processed into a grayscale block to be processed, and calculating a variable number of local feature statistical vectors of the grayscale block to be processed.

In a particular implementation, the block to be processed comprises a cast, an epithelium and a block of a background that is easy to be confused with a visible element.

In a particular implementation, in the step of calculating a variable number of local feature vectors of a block to be processed, the m SIFT feature vectors of the block to be processed are calculated as follows: applying a successive Gaussian filter to the block to be processed a plurality of times and/or a scaled block to be processed so as to obtain a multi-layer block; by calculating a difference of various pixel values of an adjacent-layer block in the multi-layer block, obtaining a Gaussian difference block between adjacent-layer blocks so as to form a multi-layer Gaussian difference block; with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, m key points are marked together; calculating a gradient value and a gradient direction of a pixel in a specific adjacent area in a plurality of adjacent areas of the key point, wherein the gradient direction is approximated to one of a pre-specified plurality of standard directions; and calculating a total gradient value of a pixel in the specific adjacent area of the key point in a specific standard direction to be taken as a component of the SIFT feature vector of the key point in the specific adjacent area in the specific standard direction.

In a particular implementation, in the step of calculating a variable number of local feature vectors of a block to be processed, the n LBP feature vectors of the block to be processed are calculated as follows: with regard to a pixel in the block to be processed, by comparing an intensity value of the pixel with the intensity values of the other pixels in a 3-pixel×3-pixel square with the pixel as the center, forming an 8-bit LBP code composed of 0 or 1, wherein a value range of the LBP code is an integer from 0 to 255; segmenting the block to be processed into windows with a fixed size, wherein the block is segmented into n windows with a fixed size; and calculating an LBP feature vector of each window, wherein the LBP feature vector is a distribution histogram from 0 to 255 of an LBP code value of a pixel in the window.

According to one embodiment of the present invention, an apparatus for processing a block to be processed of a urine sediment image is further provided, comprising: a calculation unit configured to calculate a variable number of local feature vectors of a block to be processed, wherein the local feature vector is a vector representing a feature of a local location of the block to be processed; a classification unit configured to classify the variable number of local feature statistical vectors into a fixed number of clusters so as to obtain a statistical histogram vector of the fixed number of clusters of the block to be processed, wherein the statistical histogram vector reflects the statistical distribution of the variable number of local feature statistical vectors in the fixed number of clusters; and a processing unit configured to take the statistical histogram vector as a feature in a feature set of block processing and process the block to be processed.

In a particular implementation, the variable number of local feature vectors comprise m SIFT feature vectors and n LBP feature vectors, where m and n are variable positive integers. The classification unit is further configured to: classify the m SIFT feature vectors into k1 clusters and classify the n LBP feature vectors into k2 clusters so as to obtain a statistical histogram vector of the k1 clusters of the SIFT feature vectors and a statistical histogram vector of the k2 clusters of the LBP feature vectors, where k1 and k2 are fixed positive integers.

In a particular implementation, the processing unit is further configured to: combine the statistical histogram vector of the k1 clusters of the SIFT feature vectors and the statistical histogram vector of the k2 clusters of the LBP feature vectors; and take the combined statistical histogram vector as a feature in a feature set of block processing and process the block to be processed.

In a particular implementation, the calculation unit is further configured to: convert the block to be processed into a grayscale block to be processed, and calculate a variable number of local feature vectors of the grayscale block to be processed.

In a particular implementation, the block to be processed comprises a cast, an epithelium and a block of a background that is easy to be confused with a visible element.

In a particular implementation, the calculation unit is further configured to calculate the m SIFT feature vectors of the block to be processed as follows: applying a successive Gaussian filter to the block to be processed a plurality of times and/or a scaled block to be processed so as to obtain a multi-layer block; by calculating a difference of various pixel values of an adjacent-layer block in the multi-layer block, obtaining a Gaussian difference block between adjacent-layer blocks so as to form a multi-layer Gaussian difference block; with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, m key points are marked together; calculating a gradient value and a gradient direction of a pixel in a specific adjacent area in a plurality of adjacent areas of the key point, wherein the gradient direction is approximated to one of pre-specified a plurality of standard directions; and calculating a total gradient value of a pixel in the specific adjacent area of the key point in a specific standard direction to be taken as a component of the SIFT feature vector of the key point in the specific adjacent area in the specific standard direction, with the SIFT feature vector being a statistical histogram of the total gradient value of the pixel in each standard direction in each adjacent area of the key point.

In a particular implementation, the calculation unit is further configured to calculate the n LBP feature vectors of the block to be processed as follows: with regard to a pixel in the block to be processed, by comparing an intensity value of the pixel with the intensity values of the other pixels in a 3-pixel×3-pixel square with the pixel as the center, forming an 8-bit LBP code composed of 0 or 1, wherein a value range of the LBP code is an integer from 0 to 255; segmenting the block to be processed into windows with a fixed size, wherein the block is segmented into n windows with a fixed size; and calculating an LBP feature vector of each window, wherein the LBP feature vector is a distribution histogram from 0 to 255 of an LBP code value of a pixel in the window.

Most of the features in a feature set in the prior art focus on to general features of a block to be processed, such as general size, shape and appearance, etc. of a cell, but for some visible elements (such as a cast and an epithelium), their general features always have a large intra-class difference and a high inter-class similarity, and thus it is not easy to obtain satisfying processing precision. Since the embodiments of the present invention aim at local features and the local features can reduce the intra-class difference and present an inter-class difference, the precision of processing a block to be processed is greatly improved. Since the embodiments of the present invention use a variable number of local feature vectors according to different information quantities contained in the blocks to be processed, more local feature vectors are used for a block to be processed containing a larger information quantity and less local feature vectors are used for a block to be processed containing less information quantity, such as a background. This approach improves information utilization efficiency and improves the precision of processing a block to be processed.

Since SIFT feature vectors and LBP feature vectors are used in a particular implementation of the present invention, the SIFT feature vectors, when being used for processing a block to be processed, are very robust for the size and direction, etc. of a visible element, and the LBP feature vectors, when being used for processing a block to be processed, are very robust for illumination, etc., thereby greatly improving the precision of processing a block to be processed.

In addition, since in a particular implementation of the present invention, a block to be processed is firstly converted into a grayscale block to be processed, and then a local feature statistical vector of the grayscale block to be processed is calculated, which improves the robustness of the processing result for color, etc.

In addition, LBP feature vectors not only embody certain local features of a block but also embody certain general features of a block, and SIFT feature vectors embody the local features of a block. Since in a particular implementation of the present invention, the statistical histogram vector of k1 clusters of SIFT feature vectors and the statistical histogram vector of k2 clusters of LBP feature vectors are combined, by adjusting a ratio of k1 and k2, the contribution rate of local features and general features can be better adjusted for processing a block to be processed.

DESCRIPTION OF THE ACCOMPANYING DRAWINGS

These and other features and advantages of the present invention will become more apparent byway of the detailed description hereinbelow in conjunction with the accompanying drawings.

DETAILED DESCRIPTION OF EMBODIMENTS

Various embodiments of the present invention will be described below in detail in combination with the accompanying drawings.

Figure 1:
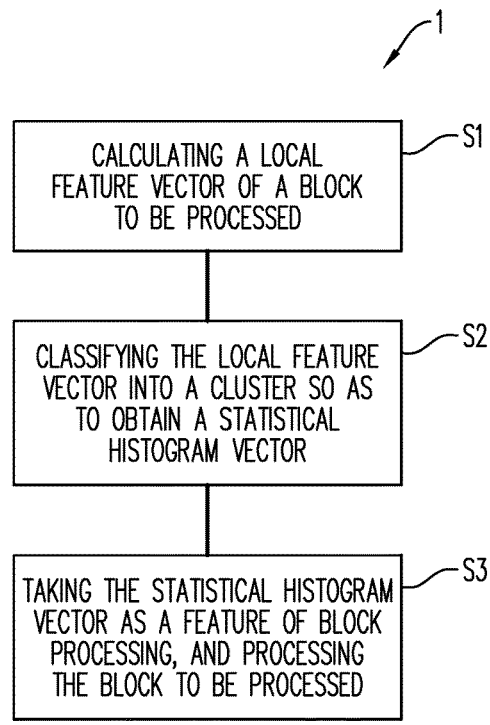
FIG. 1 shows a flowchart of a method for processing a block to be processed of a urine sediment image according to one embodiment of the present invention.

FIG. 1 shows a flowchart of a method 1 for processing a block to be processed of a urine sediment image according to one embodiment of the present invention.

In step S1, a variable number of local feature vectors of a block to be processed is calculated. General features are features that a block to be processed has integrally, such as a general shape, etc. Local features are features of a block to be processed at a local location, such as texture at the local location, etc. A local feature vector is a vector representing the local features of a block to be processed, for example, SIFT feature vectors and LBP feature vectors introduced below.

In step S2, the variable number of local feature vectors are classified into a fixed number of clusters so as to obtain a statistical histogram vector of the fixed number of clusters of the block to be processed, i.e., a bag-of-words model (BOW). The statistical histogram vector reflects the statistical distribution of the variable number of local feature vectors in the fixed number of clusters. The reason for performing step S2 is that the features in a feature set of block processing must be universal for all the blocks to be processed. Only if the variable number of local feature vectors are classified into the fixed number of clusters so as to obtain the statistical histogram vector of the fixed number of clusters, can the statistical histogram vector have a comparability between various blocks to be processed.

In step S3, the statistical histogram vector is taken as a feature in a feature set of block processing, and the block to be processed is processed.

In one embodiment, the variable number of local feature vectors comprise m SIFT feature vectors and n LBP feature vectors, where m and n are variable positive integers. The process of obtaining the statistical histogram vector after the block to be processed is clustered so as to process the block to be processed is described in detail below in combination with FIGS. 2-9.

Calculation of SIFT Feature Vectors:

Firstly, a successive Gaussian filter is applied to a block to be processed a plurality of times and/or a scaled block to be processed so as to obtain a multi-layer block.

Figure 2:
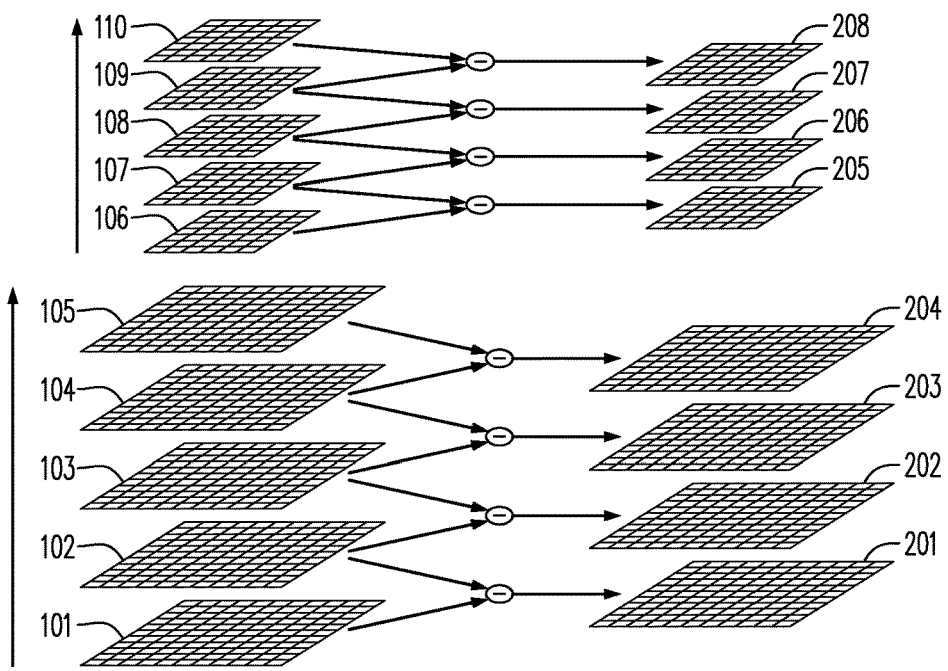
FIG. 2 shows a schematic diagram of a process of forming a multi-layer Gaussian difference block according to one embodiment of the present invention.

FIG. 2 shows an example of multiple Gaussian filters. Gaussian filter is applied to a block to be processed 101 to obtain a Gaussian block 102 after the first filter. Gaussian filter is applied to the Gaussian block 102 after the first filter to obtain a Gaussian block 103 after the second filter. Gaussian filter is applied to the Gaussian block 103 after the second filter to obtain a Gaussian block 104 after the third filter. Gaussian filter is applied to the Gaussian block 104 after the third filter to obtain a Gaussian block 105 after the fourth filter.

Then, the Gaussian block 105 after the fourth filter is scaled (a known method may be used for scaling, for example, when a 16-pixel×16-pixel block is scaled to 8-pixel×8-pixel, a half of pixels can be selected in the directions of the length and width of the block each), and a fifth filter is performed to obtain a Gaussian block 106 after the fifth filter. Gaussian filter is applied to the Gaussian block 106 after the fifth filter to obtain a Gaussian block 107 after the sixth filter. Gaussian filter is applied to the Gaussian block 107 after the sixth filter to obtain a Gaussian block 108 after the seventh filter. Gaussian filter is applied to the Gaussian block 108 after the seventh filter to obtain a Gaussian block 109 after the eighth filter. Gaussian filter is applied to the Gaussian block 109 after the eighth filter to obtain a Gaussian block 110 after the ninth filter.

Then, by calculating a difference of various pixel values corresponding to an adjacent-layer block in the multi-layer block, a Gaussian difference block between adjacent-layer blocks is obtained so as to form a multi-layer Gaussian difference block.

As shown in FIG. 2, a Gaussian difference block between the block to be processed 101 and the Gaussian block 102 after the first filter is denoted with 201. A Gaussian difference block between the Gaussian block 102 after the first filter and the Gaussian block 103 after the second filter is denoted with 202 . . . and a Gaussian difference block between the Gaussian block 109 after the eighth filter and the Gaussian block 110 after the ninth filter is denoted with 208. The Gaussian difference blocks 201-208 form a multi-layer Gaussian difference block.

Then a key point in the block to be processed 101 is marked. The particular method is: with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, it is assumed that m key points are marked together.

For example, with regard to a specific pixel in a second-layer Gaussian difference block 202, if in a 3-pixel×3-pixel×3-pixel cube with the specific pixel as the center of a first-layer Gaussian difference block 201, a second-layer Gaussian difference block 202 and a third-layer Gaussian difference block 203, the value of the specific pixel is the maximum or the minimum, then the location of the specific pixel is marked as a key point. Similar judgment is performed on each pixel in the second-layer Gaussian difference block 202, and several key points are marked in the second-layer Gaussian difference block 202. Similar judgment is performed on each pixel in the third-layer Gaussian difference block 203, a sixth-layer Gaussian difference block 206 and a seventh-layer Gaussian difference block 207, and then several key points are marked in these blocks. Since the first-layer Gaussian difference block 201 does not have a lower-layer Gaussian difference block, an eighth-layer Gaussian difference block does not have an upper-layer Gaussian difference block, a pixel of an upper-layer Gaussian difference block of a fourth-layer Gaussian difference block 204 does not correspond to that of the fourth-layer Gaussian difference block 204 due to scaling, and, a pixel of a lower-layer Gaussian difference block of a fifth-layer Gaussian difference block 205 does not correspond to that of the fifth-layer Gaussian difference block 205, there is no key point marked for these Gaussian difference blocks. The key points marked in the second, third, sixth, and seventh-layer Gaussian difference blocks are gathered, and it is assumed that m key points are marked together.

Then, with regard to any key point in the m key points, a gradient value and a gradient direction of a pixel in a specific adjacent area in a plurality of adjacent areas thereof are calculated, wherein the gradient direction is approximated to one of a pre-specified plurality of standard directions. A total gradient value of a pixel in the specific adjacent area of the key point in a specific standard direction is calculated to be taken as a component of the SIFT feature vector of the key point in the adjacent area in the specific standard direction. The SIFT feature vector is a statistical histogram of the total gradient value of the pixel in each standard direction in each adjacent area of the key point.

Figure 3:
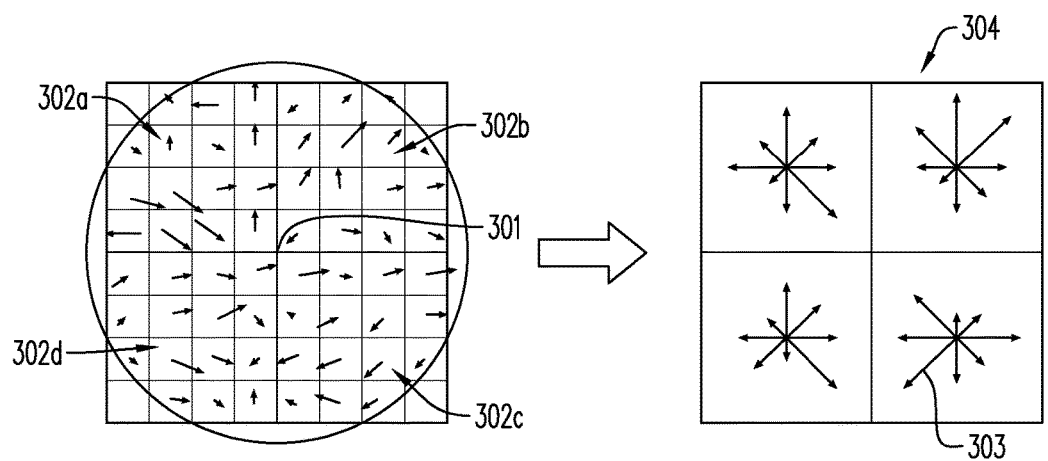
FIG. 3 shows a schematic diagram of a process of forming a SIFT feature vector of a specific key point according to one embodiment of the present invention.
Figure 4:
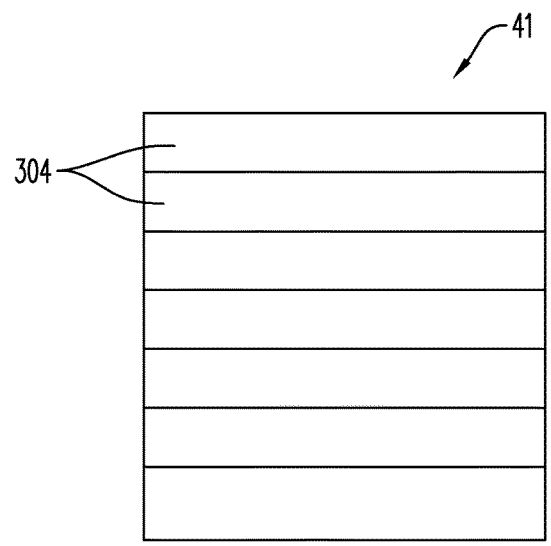
FIG. 4 shows a schematic diagram of all the SIFT feature vectors of a block to be processed according to one embodiment of the present invention.

As shown in FIG. 3, in an example, with regard to a key point 301, it is taken as an original point of a coordinate system to make an x axis and a y axis so as to form four quadrants. In each quadrant, a square with a 4-pixel side length is made by taking the key point 301 as a vertex. Four squares obtained respectively in four quadrants are taken as four adjacent areas 302a-d. With regard to each adjacent area in four adjacent areas, a gradient value and a gradient direction of each pixel therein are calculated, and the calculated gradient direction is approximated to one of eight pre-specified standard directions. It is assumed that eight standard directions are specified: 0 degree, 45 degrees, 90 degrees, 135 degrees, 180 degrees, 225 degrees, 270 degrees and 315 degrees. Thus, 22.5 degrees-67.5 degrees can approximate to 45 degrees, and 67.5 degrees-112.5 degrees can approximate to 90 degrees, and so on. With regard to a specific adjacent area, for example, 302c, the gradient values of all the pixels with a pixel gradient direction of 0 degree are accumulated, and the gradient values of all the pixels with a pixel gradient direction of 45 degrees are accumulated, and so on, and a statistical histogram of a pixel total gradient value in various standard directions of 0 degree, 45 degrees, 90 degrees, 135 degrees, 180 degrees, 225 degrees, 270 degrees and 315 degrees in the adjacent area 302c is obtained and is denoted with 303. With regard to the key point 301, the SIFT feature vector is a statistical histogram of the pixel total gradient value in each standard direction in various adjacent areas 302a-d, which is denoted with 304.

With regard to each key point in the m key points, a corresponding statistical histogram 304 can be obtained. Thus, m SIFT feature vectors 41 of a block to be processed are calculated.

Calculation of LBP Feature Vectors:

Firstly, with regard to a pixel in a block to be processed, by comparing an intensity value of the pixel with the intensity values of the other pixels in a 3-pixel×3-pixel square with the pixel as the center, an 8-bit LBP code composed of 0 or 1 is formed, wherein a value range of the LBP code is an integer from 0 to 255.

Figure 5:
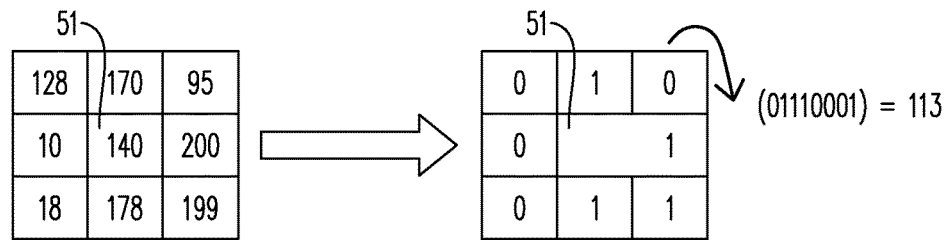
FIG. 5 shows an LBP code formed with regard to a specific pixel in a block to be processed according to one embodiment of the present invention.

As shown in FIG. 5, it is assumed that an intensity value of a certain pixel 51 in a block to be processed is 140. The remaining eight pixels in a 3-pixel×3-pixel square with the pixel 51 as the center respectively are 95, 200, 199, 178, 18, 10, 128 and 170. 140 is compared with 95, 200, 199, 178, 18, 10, 128 and 170 respectively. If the former is greater than the latter, a value 0 is marked, otherwise, a value 1 is marked. Lastly, it is obtained that an LBP code (01110001)=113.

Then, the block to be processed is segmented into windows with a fixed size (such as 64-pixel×64-pixel), wherein the block is segmented into n windows with a fixed size.

Since the size of the window is fixed and the size of the block to be processed is not fixed, the number of n changes with the size of the block to be processed.

Lastly, the LBP feature vector of each window is calculated, wherein the LBP feature vector is a distribution histogram from 0 to 255 of an LBP code value of a pixel in the window.

Figure 6:
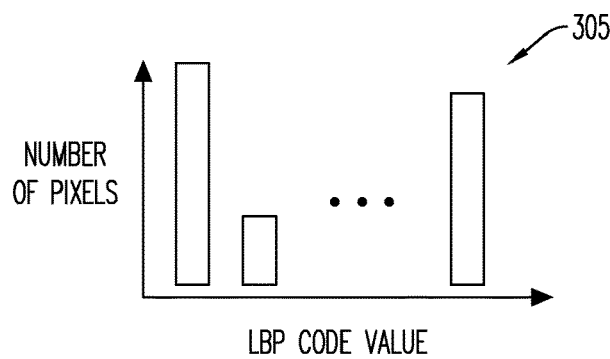
FIG. 6 shows a schematic diagram of an LBP feature vector of a specific window of a block to be processed according to one embodiment of the present invention.
Figure 7:
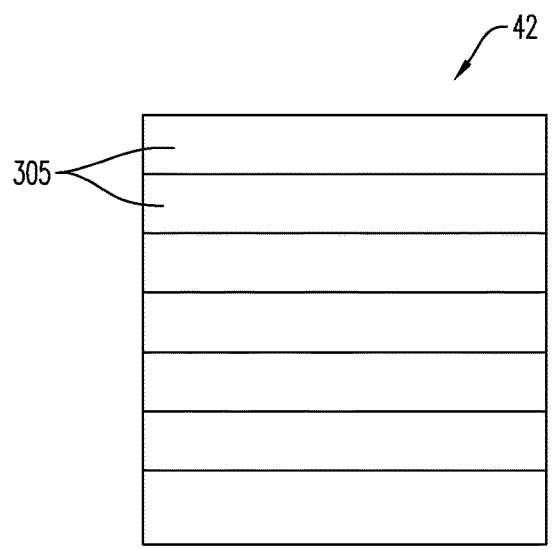
FIG. 7 shows a schematic diagram of all the LBP feature vectors of a block to be processed according to one embodiment of the present invention.

With regard to a specific window, each pixel thereof has an LBP code value from 0 to 255. The horizontal axis in FIG. 6 represents the LBP code value, and the vertical axis represents how many pixels have the LBP code value in the specific window. Therefore, FIG. 6 shows a distribution histogram 305 from 0 to 255 of an LBP code value of a pixel in a specific window. Since the block to be processed has n windows, the block to be processed has n LBP feature vectors 305, as shown in FIG. 7. All the n LBP feature vectors are denoted with 42.

The Bag-Of-Words Model is Applied to the SIFT Feature Vectors and the LBP Feature Vectors:

The m SIFT feature vectors are classified into k1 clusters and the n LBP feature vectors are classified into k2 clusters so as to obtain a statistical histogram vector of the k1 clusters of the SIFT feature vectors and a statistical histogram vector of the k2 clusters of the LBP feature vectors, where k1 and k2 are fixed positive integers. The significance of doing this is that since the number m of the SIFT feature vectors and the number n of the LBP feature vectors obtained from different blocks to be processed are all different, only if the vectors are classified into a fixed number of clusters so as to obtain a statistical histogram vector of the fixed number of clusters, can the statistical histogram vector have a comparability between various blocks to be processed.

Figure 8:
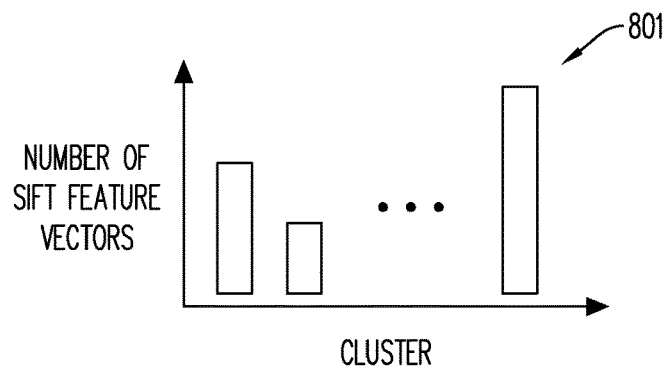
FIG. 8 shows a schematic diagram of a statistical histogram vector of a block to be processed with regard to k1 clusters according to one embodiment of the present invention.

The prior art has many clustering methods. Taking an SIFT feature vector as an example, for example, with regard to a sample set containing many SIFT feature vectors, a similarity between various SIFT feature vectors is calculated and these SIFT feature vectors are clustered according to the similarity by using a known clustering algorithm in the art to obtain k1 clusters. These SIFT feature vectors are respectively clustered into one cluster in the k1 clusters. When a new SIFT feature vector is received, a similarity of the new SIFT feature vector and a SIFT feature vector in a certain cluster in the k1 clusters is voted so as to classify the vector into one cluster. FIG. 8 shows a statistical histogram vector of classifying m SIFT feature vectors into k1 clusters, i.e., a statistical histogram vector 801 of a block to be processed with regard to k1 clusters, and it shows with regard to each of the k1 clusters, how many SIFT feature vectors belong to the cluster. Similarly, a statistical histogram vector of classifying n LBP feature vectors into k2 clusters can be made, i.e., a statistical histogram vector of a block to be processed with regard to k2 clusters.

The statistical histogram vector after the SIFT feature vectors are clustered and the statistical histogram vector after the LBP feature vectors are clustered are combined:

Firstly, the statistical histogram vector of the k1 clusters of the SIFT feature vectors and the statistical histogram vector of the k2 clusters of the LBP feature vectors are combined. Then, the combined statistical histogram vector is taken as a feature in a feature set of block processing, and the block to be processed is processed.

The statistical histogram vector after the LBP feature vectors are clustered can represent the shape of a foreground portion (such as a visible element) in the block to be processed. The statistical histogram vector after the SIFT feature vectors are clustered aims at local texture of the foreground portion, etc. The embodiments of the present invention comprehensively use the advantages of the statistical histogram vector after the LBP feature vectors are clustered and the statistical histogram vector after the SIFT feature vectors are clustered. The contribution rate of the two portions of features for the entirety can be adjusted by adjusting the ratio of k1 and k2. For example, in an application for classifying a cast, an epithelium and a block of a background that is easy to be confused with a visible element, k1>k2 can be set.

Grayscale Conversion:

In order to reduce the influence of color, etc. on the processing result of a block to be processed, in the embodiments of the present invention, before the SIFT feature vectors and the LBP feature vectors of a block to be processed are calculated, the block to be processed is firstly converted into a grayscale block to be processed and then the SIFT feature vectors and the LBP feature vectors of the grayscale block to be processed are calculated. In this way, the robustness of the processing result for color, etc. is improved.

The method for processing a block to be processed in the embodiments of the present invention is applied to the processing of various blocks, and in particular to the processing of a cast, an epithelium and a block of a background that is easy to be confused with a visible element. This is because maxicells such as a cast and an epithelium have a large intra-class difference and a high inter-class similarity, and the size, shape, appearance, texture and direction, etc. between casts have a great difference.

Other Variants

Although in the above-mentioned embodiments, the local feature vector comprises two statistical vectors, a SIFT feature vector and an LBP feature vector, the vector actually can also comprise other local feature statistical vectors and local feature non-statistical vectors. Only if the local features can be reflected, can the robustness of processing one or more of the size, shape, appearance, texture and direction and illumination and color of a visible element be improved. Experiments show that the SIFT feature vector and the LBP feature vector are two relatively good local feature vectors.

Although the statistical histogram vector after the SIFT feature vectors are clustered and the statistical histogram vector after the LBP feature vectors are clustered are combined in the above-mentioned embodiments, those skilled in the art should understand that, for example, the above-mentioned combination process does not exist under the condition where there is only one local feature vector (such as a SIFT feature vector).

Although in the above-mentioned embodiments, in order to reduce the influence of color, etc. on the processing result, before the SIFT feature vectors and the LBP feature vectors of a block to be processed are calculated, the block to be processed is firstly converted into a grayscale block to be processed, those skilled in the art should understand that this grayscale conversion may not be performed.

Although in the above-mentioned embodiments, m SIFT feature vectors and n LBP feature vectors are calculated by means of a specific process; however, the SIFT feature vectors and the LBP feature vectors are known concepts, the vectors are not merely used for processing a block to be processed all the time. It is known to those skilled in the related art that a calculation process of the vectors may have various variants. For example, a number of scalings can be performed in the process of applying a number of Gaussian filters, the number of Gaussian filters can be adjusted, the size of a window can be taken as 32-pixel×32-pixel or 16-pixel×16-pixel when calculating the LBP feature vector, etc.

Figure 9:
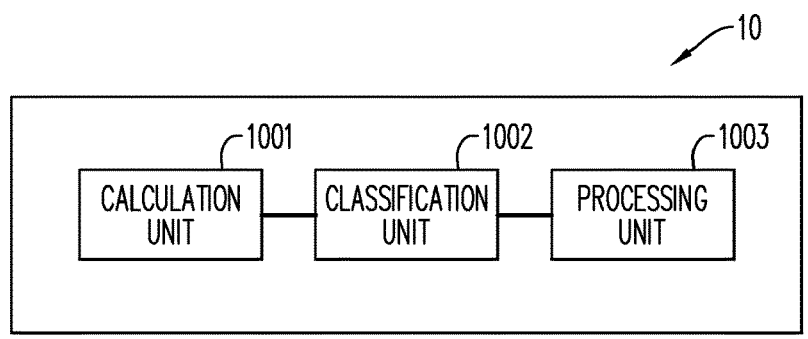
FIG. 9 shows a block diagram of an apparatus for processing a block to be processed of a urine sediment image according to one embodiment of the present invention.

As shown in FIG. 9, an apparatus 10 for processing a block to be processed of a urine sediment image according to one embodiment of the present invention comprises a calculation unit 1001, a classification unit 1002 and a processing unit 1003. The calculation unit 1001 is configured to calculate a variable number of local feature vectors of a block to be processed, wherein the local feature vector is a vector representing a feature of a local location of the block to be processed. The classification unit 1002 is configured to classify the variable number of local feature vectors into a fixed number of clusters so as to obtain a statistical histogram vector of the fixed number of clusters of the block to be processed, wherein the statistical histogram vector reflects the statistical distribution of the variable number of local feature vectors in the fixed number of clusters. The processing unit 1003 is configured to take the statistical histogram vector as a feature in a feature set of block processing and process the block to be processed. The apparatus 10 can be realized using software, hardware (e.g., an integrated circuit, a FPGA, etc.) or a combination of software and hardware.

In addition, the variable number of local feature vectors may comprise m SIFT feature vectors and n LBP feature vectors, where m and n are variable positive integers. The classification unit 1002 may be further configured to: classify the m SIFT feature vectors into k1 clusters and classify the n LBP feature vectors into k2 clusters so as to obtain a statistical histogram vector of the k1 clusters of the SIFT feature vectors and a statistical histogram vector of the k2 clusters of the LBP feature vectors, where k1 and k2 are fixed positive integers.

In addition, the processing unit 1003 may be further configured to: combine the statistical histogram vector of the k1 clusters of the SIFT feature vectors and the statistical histogram vector of the k2 clusters of the LBP feature vectors; and take the combined statistical histogram vector as a feature in a feature set of block processing and process the block to be processed.

In addition, the calculation unit 1001 may be further configured to: convert the block to be processed into a grayscale block to be processed, and calculate a variable number of local feature vectors of the grayscale block to be processed.

In addition, the block to be processed may comprise a cast, an epithelium and a block of a background that is easy to be confused with a visible element.

In addition, the calculation unit 1001 may be further configured to calculate the m SIFT feature vectors of the block to be processed as follows: applying a successive Gaussian filter to the block to be processed a plurality of times and/or a scaled block to be processed so as to obtain a multi-layer block; by calculating a difference of various pixel values corresponding to an adjacent-layer block in the multi-layer block, obtaining a Gaussian difference block between adjacent-layer blocks so as to form a multi-layer Gaussian difference block; with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, m key points are marked together; calculating a gradient value and a gradient direction of a pixel in a specific adjacent area in a plurality of adjacent areas of the key point, wherein the gradient direction is approximated to one of a pre-specified plurality of standard directions; and calculating a total gradient value of a pixel in the specific adjacent area of the key point in a specific standard direction to be taken as a component of the SIFT feature vector of the key point in the specific adjacent area in the specific standard direction.

In addition, the calculation unit 1001 may be further configured to calculate the n LBP feature vectors of the block to be processed as follows: with regard to a pixel in the block to be processed, by comparing an intensity value of the pixel with the intensity values of the other pixels in a 3-pixel×3-pixel square with the pixel as the center, forming an 8-bit LBP code composed of 0 or 1, wherein a value range of the LBP code is an integer from 0 to 255; segmenting the block to be processed into windows with a fixed size, wherein the block is segmented into n windows with a fixed size; and calculating an LBP feature vector of each window, wherein the LBP feature vector is a distribution histogram from 0 to 255 of an LBP code value of a pixel in the window.

Figure 10:
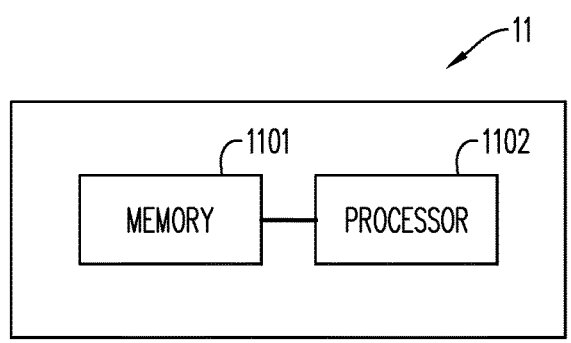
FIG. 10 shows a block diagram of a device for processing a block to be processed of a urine sediment image according to one embodiment of the present invention.

FIG. 10 shows a device 11 for processing a block to be processed of a urine sediment image according to one embodiment of the present invention. The device 11 may comprise a memory 1101 and a processor 1102. The memory 1101 is used for storing an executable instruction. The processor 1102 is used for performing an operation performed by each unit in the apparatus 10 according to the executable instruction stored in the memory.

In addition, one embodiment of the present invention further provides a machine-readable medium on which an executable instruction is stored, when the executable instruction is executed, a machine is caused to perform an operation performed by the processor 1102.

Those skilled in the art should understand that various variations and modifications can be made to the above various embodiments without departing from the spirit of the present invention. Therefore, the scope of protection of the present invention should be defined by the appended claims.

The invention claimed is:

1. A computer implemented method for processing a block to be processed of a urine sediment image by a processor executing executable instructions stored in a non-transitory memory, the method comprising:

calculating a variable number of local feature vectors of the block to be processed, wherein the local feature vector is a vector representing a feature of a local location of the block to be processed, the variable number of local feature vectors comprise m scale invariant feature transform (SIFT) feature vectors and n local binary pattern (LBP) feature vectors, where m and n are variable positive integers, wherein the m SIFT feature vectors of the block to be processed are calculated as follows:

applying a successive Gaussian filter to the block to be processed a plurality of times and/or a scaled block to be processed so as to obtain a multi-layer block;

by calculating a difference of various pixel values corresponding to an adjacent-layer block in the multi-layer block, obtaining a Gaussian difference block between adjacent-layer blocks so as to form a multi-layer Gaussian difference block;

with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, m key points are marked altogether;

calculating a gradient value and a gradient direction of a pixel in a specific adjacent area in a plurality of adjacent areas of the key point, wherein the gradient direction is approximated to one of a pre-specified plurality of standard directions; and calculating a total gradient value of a pixel in the specific adjacent area of the key point in a specific standard direction to be taken as a component of the SIFT feature vector of the key point in the specific adjacent area in the specific standard direction;

classifying the m SIFT feature vectors into k1 clusters and classifying the n LBP feature vectors into k2 clusters so as to obtain a statistical histogram vector of the k1 clusters of the SIFT feature vectors and a statistical histogram vector of the k2 clusters of the LBP feature vectors, where k1 and k2 are fixed positive integers;

taking the statistical histogram vector as a feature in a feature set of block processing; and processing the block to be processed with the statistical histogram vector in the feature set of block processing.

2. The method as claimed in claim 1, characterized in that the step of taking the statistical histogram vector as a feature in a feature set of block processing and processing the block to be processed comprises:

combining the statistical histogram vector of the k1 clusters of the SIFT feature vectors and the statistical histogram vector of the k2 clusters of the LBP feature vectors; and taking the combined statistical histogram vector as a feature in a feature set of block processing and processing the block to be processed.

3. The method as claimed in claim 1, characterized in that the step of calculating a variable number of local feature vectors of a block to be processed comprises: converting the block to be processed into a grayscale block to be processed, and calculating a variable number of local feature vectors of the grayscale block to be processed.

4. The method as claimed in claim 1, characterized in that the block to be processed comprises a cast, an epithelium and a block of a background that is easy to be confused with a visible element.

5. The method as claimed in claim 1, characterized in that in the step of calculating a variable number of local feature vectors of a block to be processed, the n LBP feature vectors of the block to be processed are calculated as follows:

with regard to a pixel in the block to be processed, by comparing an intensity value of the pixel with the intensity values of the other pixels in a 3-pixel×3-pixel square with the pixel as the center, forming an 8-bit LBP code composed of 0 or 1, wherein a value range of the LBP code is an integer from 0 to 255;

segmenting the block to be processed into windows with a fixed size, wherein the block is segmented into n windows with a fixed size; and calculating an LBP feature vector of each window, wherein the LBP feature vector is a distribution histogram from 0 to 255 of an LBP code value of a pixel in the window.

6. An apparatus for processing a block to be processed of a urine sediment image, comprising:

a calculation unit configured to calculate a variable number of local feature vectors of a block to be processed, wherein the local feature vector is a vector representing a feature of a local location of the block to be processed, the variable number of local feature vectors comprise m scale invariant feature transform (SIFT) feature vectors and n local binary pattern (LBP) feature vectors, where m and n are variable positive integers, the calculation unit being further configured to calculate the m SIFT feature vectors of the block to be processed as follows:

applying a successive Gaussian filter to the block to be processed a plurality of times and/or a scaled block to be processed so as to obtain a multi-layer block;

by calculating a difference of various pixel values of an adjacent-layer block in the multi-layer block, obtaining a Gaussian difference block between adjacent-layer blocks so as to form a multi-layer Gaussian difference block;

with regard to a specific pixel in a specific-layer Gaussian difference block in the multi-layer Gaussian difference block, judging whether the value of the specific pixel is a maximum pixel value or a minimum pixel value in a 3-pixel×3-pixel×3-pixel cube with the specific pixel as the center of the specific-layer Gaussian difference block, an upper-layer Gaussian difference block and a lower-layer Gaussian difference block, and if yes, marking the location of the specific pixel as a key point, wherein with regard to the multi-layer Gaussian difference block, m key points are marked together;

calculating a gradient value and a gradient direction of a pixel in a specific adjacent area in a plurality of adjacent areas of the key point, wherein the gradient direction is approximated to one of a pre-specified plurality of standard directions; and calculating a total gradient value of a pixel in the specific adjacent area of the key point in a specific standard direction to be taken as a component of the SIFT feature vector of the key point in the specific adjacent area in the specific standard direction;

a classification unit configured to classify the m SIFT feature vectors into k1 clusters and classify the n LBP feature vectors into k2 clusters so as to obtain a statistical histogram vector of the k1 clusters of the SIFT feature vectors and a statistical histogram vector of the k2 clusters of the LBP feature vectors, where k1 and k2 are fixed positive integers; and a processing unit configured to take the statistical histogram vector as a feature in a feature set of block processing and process the block to be processed with the statistical histogram vector in the feature set of block processing;

wherein the calculation unit, the classification unit and the processing unit include software, hardware, or a combination of software and hardware.

7. The apparatus as claimed in claim 6, characterized in that the processing unit is further configured to:

combine the statistical histogram vector of the k1 clusters of the SIFT feature vectors and the statistical histogram vector of the k2 clusters of the LBP feature vectors; and take the combined statistical histogram vector as a feature in a feature set of block processing and process the block to be processed.

8. The apparatus as claimed in claim 6, characterized in that the calculation unit is further configured to: convert the block to be processed into a grayscale block to be processed, and calculate a variable number of local feature vectors of the grayscale block to be processed.

9. The apparatus as claimed in claim 6, characterized in that the block to be processed comprises a cast, an epithelium and a block of a background that is easy to be confused with a visible element.

10. The apparatus as claimed in claim 6, characterized in that the calculation unit is further configured to calculate the n LBP feature vectors of the block to be processed as follows:

with regard to a pixel in the block to be processed, by comparing an intensity value of the pixel with the intensity values of the other pixels in a 3-pixel×3-pixel square with the pixel as the center, forming an 8-bit LBP code composed of 0 or 1, wherein a value range of the LBP code is an integer from 0 to 255;

segmenting the block to be processed into windows with a fixed size, wherein the block is segmented into n windows with a fixed size; and calculating an LBP feature vector of each window, wherein the LBP feature vector is a distribution histogram from 0 to 255 of an LBP code value of a pixel in the window.

11. A device for processing a block to be processed of a urine sediment image, comprising:
- a non-transitory memory for storing executable instructions, the executable instructions, when executed, implementing the method of claim 1; and
- a processor for executing the executable instructions.

12. A non-transitory machine-readable medium on which an executable instruction is stored, wherein when the executable instruction is executed, a machine is caused to perform the method of claim 1.

* * * * *